(12) United States Patent
Okada (10) Patent No.: US 10,352,765 B2
(45) Date of Patent: Jul. 16, 2019

(54) RADIATION IMAGING APPARATUS HAVING FUNCTION OF DETECTING START OF RADIATION IRRADIATION AND RADIATION IMAGING SYSTEM

(71) Applicant: CANON KABUSHIKI KAISHA, Tokyo (JP)

(72) Inventor: Hideyuki Okada, Honjo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/877,694

(22) Filed: Jan. 23, 2018

(65) Prior Publication Data

US 2018/0216993 A1    Aug. 2, 2018

(30) Foreign Application Priority Data

Feb. 1, 2017   (JP) .................................. 2017-016978

(51) Int. Cl.

| G01J 1/42 | (2006.01) |
|---|---|
| H04N 5/374 | (2011.01) |
| G01T 1/29 | (2006.01) |
| H04N 5/3745 | (2011.01) |
| H04N 5/378 | (2011.01) |
| H04N 5/32 | (2006.01) |

(Continued)

(52) U.S. Cl.
CPC .............. *G01J 1/4228* (2013.01); *H04N 5/32* (2013.01); *H04N 5/3698* (2013.01); *H04N 5/378* (2013.01); *H04N 5/3745* (2013.01); *G01J 1/0228* (2013.01); *G01T 1/29* (2013.01)

(58) Field of Classification Search
CPC .... G01J 1/4228; G01J 1/0228; H04N 5/3745; H04N 5/378; H04N 5/32; H04N 5/3698; G01T 1/24; G01T 1/29
See application file for complete search history.

(56) References Cited

U.S. PATENT DOCUMENTS

| 9,048,154 B2 | 6/2015 | Takenaka et al. |
| 9,128,196 B2 | 9/2015 | Sato et al. |
| 9,134,432 B2 | 9/2015 | Iwashita et al. |

(Continued)

FOREIGN PATENT DOCUMENTS

JP    2014-168202    9/2014

OTHER PUBLICATIONS

U.S. Appl. No. 15/560,212, Hideyuki Okada, filed Sep. 21, 2017.
U.S. Appl. No. 15/561,122, Eriko Sato, filed Sep. 25, 2017.

*Primary Examiner* — Michael C Bryant
(74) *Attorney, Agent, or Firm* — Venable LLP (57) ABSTRACT

Apparatus includes: pixel array having bias line; readout circuit; bias circuit supplying bias voltage to the bias line and having detector to detect current of the bias line and having amplifier and ADC; first power supply supplying voltage to the readout circuit; second power supply supplying voltage to the amplification circuit; and power supply supplying voltage to the first and second power supplies and the ADC via voltage line and ground line. The ground line includes first ground line connecting ground terminals of the first and second reference power supplies and second ground line connected to the power supply and the first ground line. Impedance of the second ground line is higher than that of the first ground line, arranged between the first and second reference power supplies.

17 Claims, 10 Drawing Sheets

(51) Int. Cl.
  *H04N 5/369*    (2011.01)
  *G01J 1/02*     (2006.01)

(56) References Cited

U.S. PATENT DOCUMENTS

| | | |
|---|---|---|
| 9,234,966 B2 | 1/2016 | Sugawara et al. |
| 9,423,512 B2 | 8/2016 | Sato et al. |
| 9,445,030 B2 | 9/2016 | Yagi et al. |
| 9,462,989 B2 | 10/2016 | Takenaka et al. |
| 9,468,414 B2 | 10/2016 | Ryu et al. |
| 9,470,800 B2 | 10/2016 | Iwashita et al. |
| 9,470,802 B2 | 10/2016 | Okada |
| 9,541,653 B2 | 1/2017 | Iwashita et al. |
| 9,655,586 B2 | 5/2017 | Yagi et al. |
| 9,812,474 B2 | 11/2017 | Yagi et al. |
| 9,885,790 B2 | 2/2018 | Okada et al. |
| 2014/0239186 A1* | 8/2014 | Sato ................... H04N 5/32 250/393 |
| 2014/0361189 A1* | 12/2014 | Kameshima ......... H04N 5/3765 250/393 |
| 2016/0084969 A1 | 3/2016 | Sato et al. |
| 2016/0178764 A1 | 6/2016 | Ryu et al. |
| 2017/0038480 A1* | 2/2017 | Groepl .................... G01T 1/247 |
| 2017/0285189 A1 | 10/2017 | Ryu et al. |
| 2017/0303878 A1 | 10/2017 | Iwashita et al. |

\* cited by examiner

RADIATION IMAGING APPARATUS HAVING FUNCTION OF DETECTING START OF RADIATION IRRADIATION AND RADIATION IMAGING SYSTEM

BACKGROUND OF THE INVENTION

Field of the Invention

The present invention relates to a radiation imaging apparatus and a radiation imaging system.

Description of the Related Art

A radiation imaging apparatus performs an imaging operation in synchronization with radiation irradiation by a radiation generation apparatus. Japanese Patent Laid-Open No. 2014-168202 discloses a radiation imaging apparatus that has a function of detecting the start of radiation irradiation. The radiation imaging apparatus of Japanese Patent Laid-Open No. 2014-168202 includes a pixel array in which a plurality of pixels each including a conversion element that converts radiation into charges and accumulates the charges are arranged, a bias line for applying a bias voltage to the conversion element included in each of the plurality of pixels, and a detection circuit that detects a current flowing in the bias line. This radiation imaging apparatus detects the start of radiation irradiation to the pixel array based on an output from the detection circuit and controls, in response to the detection, the charge accumulation operation performed by the plurality of pixels.

Noise can mix into the bias current flowing in the bias line when a factor other than radiation irradiation, for example, a force such as an impact is applied to the bias current. If this noise is large, the start of radiation irradiation may be erroneously determined even though the radiation irradiation has not actually started. The occurrence of such an erroneous determination can cause the radiation imaging apparatus to erroneously shift to an imaging operation. If the radiation imaging apparatus shifts to the imaging operation, it can be set to an imaging disabled state in which no imaging operation can be performed until the preparation for the next imaging operation has been completed.

On the other hand, as a general trend, there is a demand to decrease the weight of the radiation imaging apparatus to improve the transportability and the usability of the radiation imaging apparatus. Hence, an impact tends to be transmitted more easily to an internal circuit board since the rigidity of the housing has decreased. There can also be a demand for a smaller size, higher density circuit board as well. For example, in a circuit board, there is a tendency to adopt a small-size high-capacity ceramic capacitor and to integrate a plurality of circuits onto a small number of substrates. As a result, if an impact is transmitted to the circuit board, voltage noise is generated from the ceramic capacitor by a piezoelectric effect, and an erroneous operation is easily induced from the transmission of the noise to various circuits caused by the interference between the circuits.

SUMMARY OF THE INVENTION

The present invention provides, in a radiation imaging apparatus that has a function of detecting the start of radiation irradiation, a technique advantageous in reducing an erroneous detection which can be generated when a force is applied to the radiation imaging apparatus.

One of aspect of the present invention provides a radiation imaging apparatus comprising: a pixel array in which a plurality of pixels each including a conversion element that converts radiation into an analog signal are arranged and a bias line used to provide a bias voltage to the conversion element of each of the plurality of pixels is arranged; a readout circuit configured to read out the analog signal from the pixel array; a bias circuit configured to supply the bias voltage to the bias line and including a detection circuit configured to detect a current flowing in the bias line to detect a start of radiation irradiation to the pixel array, the detection circuit including an amplification circuit configured to output an analog signal in accordance with the current and an AD converter configured to convert the analog signal output from the amplification circuit into a digital signal; a first reference power supply configured to supply a first reference voltage to the readout circuit; a second reference power supply configured to supply a second reference voltage to the amplification circuit; and a power supply circuit configured to supply a power supply voltage to at least the first reference power supply, the second reference power supply, and the AD converter via a power supply voltage line and a ground line, wherein the ground line includes a first ground line that connects a ground terminal of the first reference power supply and a ground terminal of the second reference power supply to each other and a second ground line connected to the power supply circuit and the first ground line, an impedance of the second ground line is higher than an impedance of a portion of the first ground line, which is arranged between the first reference power supply and the second reference power supply, and a ground terminal of the AD converter is connected to the second ground line without intervention of the first ground line.

Further features of the present invention will become apparent from the following description of exemplary embodiments with reference to the attached drawings.

DESCRIPTION OF THE EMBODIMENTS

Exemplary embodiments of the present invention will be described below with reference to the accompanying drawings.

Figure 1:
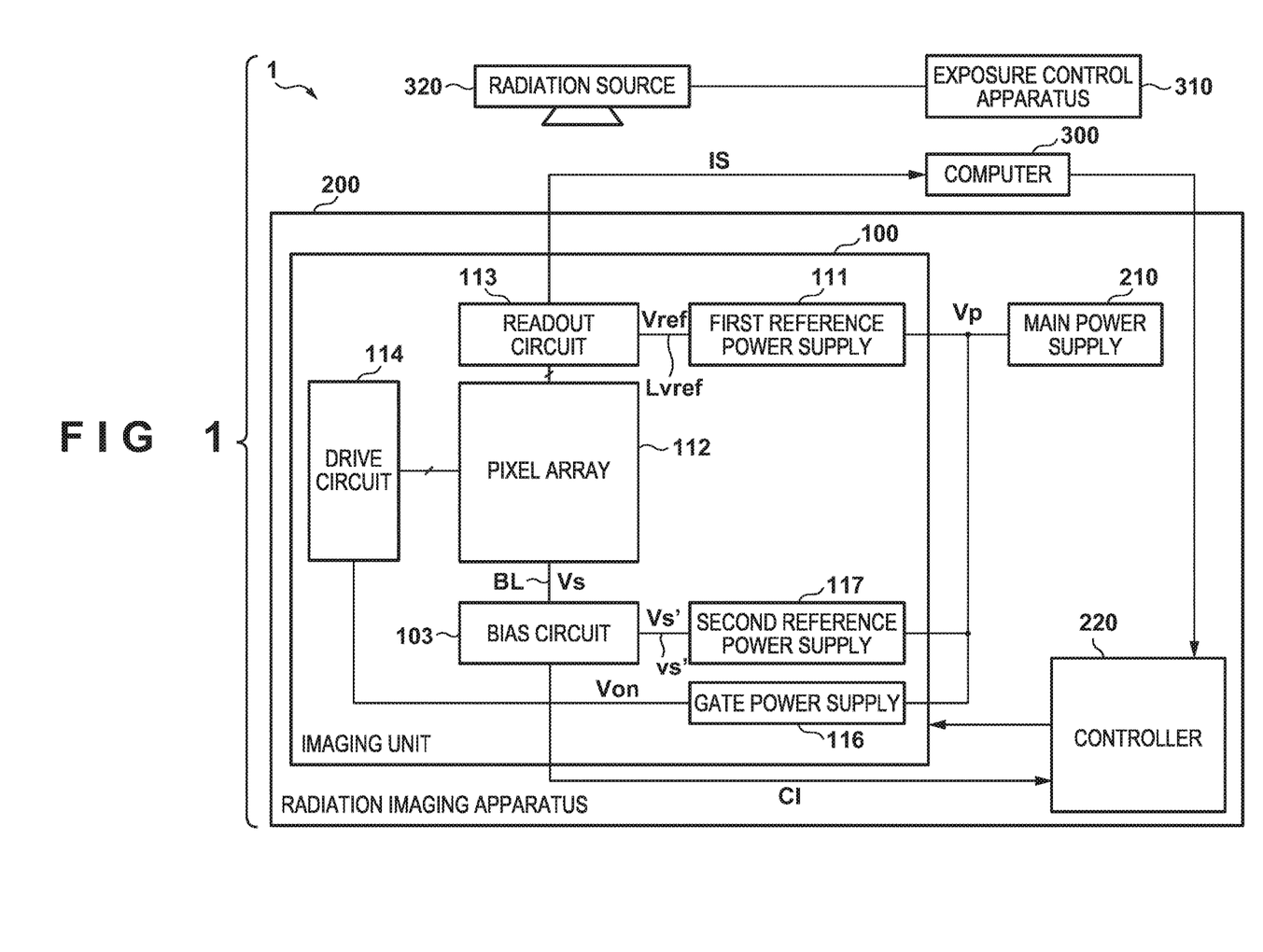
FIG. 1 is a block diagram showing an example of the arrangement of a radiation imaging system according to an embodiment of the present invention.

FIG. 1 shows the arrangement of a radiation imaging system 1 according to an embodiment of the present invention. The radiation imaging system 1 is arranged so as to perform radiation irradiation on an object and capture an image of the radiation transmitted through the object. Assume that the concept of radiation can include γ-rays, α-rays, β-rays in addition to X-rays. The radiation imaging system can include a radiation imaging apparatus 200, a computer 300, an exposure control apparatus 310, and a radiation source 320.

The exposure control apparatus 310 instructs the radiation source 320 to expose an object with radiation (perform radiation irradiation on the object). The exposure control apparatus 310 includes, for example, an exposure button and transmits an exposure instruction to the radiation source 320 to perform exposure, in accordance with the operation of the exposure button. In addition to controlling the radiation imaging apparatus 200, the computer 300 can be arranged to process each image signal IS output from the radiation imaging apparatus 200. The computer 300 may be integrated with the radiation imaging apparatus 200, some of the functions of the computer 300 may be incorporated into the radiation imaging apparatus 200, or some of the functions of the radiation imaging apparatus 200 may be incorporated into the computer 300.

The radiation imaging apparatus 200 is arranged so as to irradiate an object with radiation from the radiation source 320 and capture a radiation image formed by the radiation transmitted through the object. The radiation imaging apparatus 200 can include, for example, an imaging unit 100, a power supply circuit 210, and a controller 220. The imaging unit 100 can include, for example, a pixel array 112, a bias circuit 103, a readout circuit 113, a drive circuit 114, a first reference power supply 111, a pixel array 112, a second reference power supply 117, and a gate power supply 116.

The pixel array 112, in which a plurality of pixels each including a conversion element that converts radiation into an analog signal (electrical signal) are arranged, includes a bias line BL that provides a bias voltage to the conversion elements of the plurality of pixels. The plurality of pixels are arranged in a two-dimensional array so as to form a plurality of rows and a plurality of columns. The bias circuit 103 provides a bias voltage Vs to the bias line BL of the pixel array 112. In order to detect the start of radiation irradiation to the pixel array 112, the bias circuit 103 includes a detection circuit that detects the current flowing in the bias line BL. The readout circuit 113 reads out analog signals from the pixels of a row selected by the drive circuit 114 from the plurality of pixels of the pixel array 112. The drive circuit 114 selects a row which is to be the driving target among the plurality of rows formed by the plurality of pixels of the pixel array 112.

The power supply circuit 210 includes, for example, a battery, a DCDC converter, and the like and supplies a power supply voltage Vp to the first reference power supply 111, the second reference power supply 117, and the gate power supply (voltage generation circuit) 116. The power supply circuit 210 supplies the power supply voltage Vp to each element forming the imaging unit 100. The first reference power supply 111 receives the power supply voltage Vp and generates a first reference voltage Vref which is supplied to the readout circuit 113 via a first reference voltage line Lvref. The second reference power supply 117 generates a second reference voltage Vs' which is supplied to the bias circuit 103 via a second reference voltage line Lvs'. The gate power supply 116 (voltage generation circuit) generates a gate voltage Von which is supplied to the drive circuit 114. The drive circuit 114 applies the gate voltage Von to the transistor of each pixel of a selected row.

The controller 220 detects, based on current information CI supplied from the detection circuit of the bias circuit 103, the start of radiation irradiation to the pixel array 112. The controller 220 also controls the operation of the imaging unit 100. For example, upon detecting the start of radiation irradiation to the pixel array 112, the controller 220 causes the imaging unit 100 to shift from a reset operation to an accumulation operation. Upon completion of the accumulation operation, the controller causes the imaging unit 100 to shift to a readout operation. All or some of the functions of the controller 220 may be incorporated in the imaging unit 100. The controller 220 can be formed from, for example, a PLD (Programmable Logic Device) such as an FPGA (Field Programmable Gate Array), an ASIC (Application Specific Integrated Circuit), a general-purpose computer incorporating a program, or a combination of all or some of these components.

Figure 2:
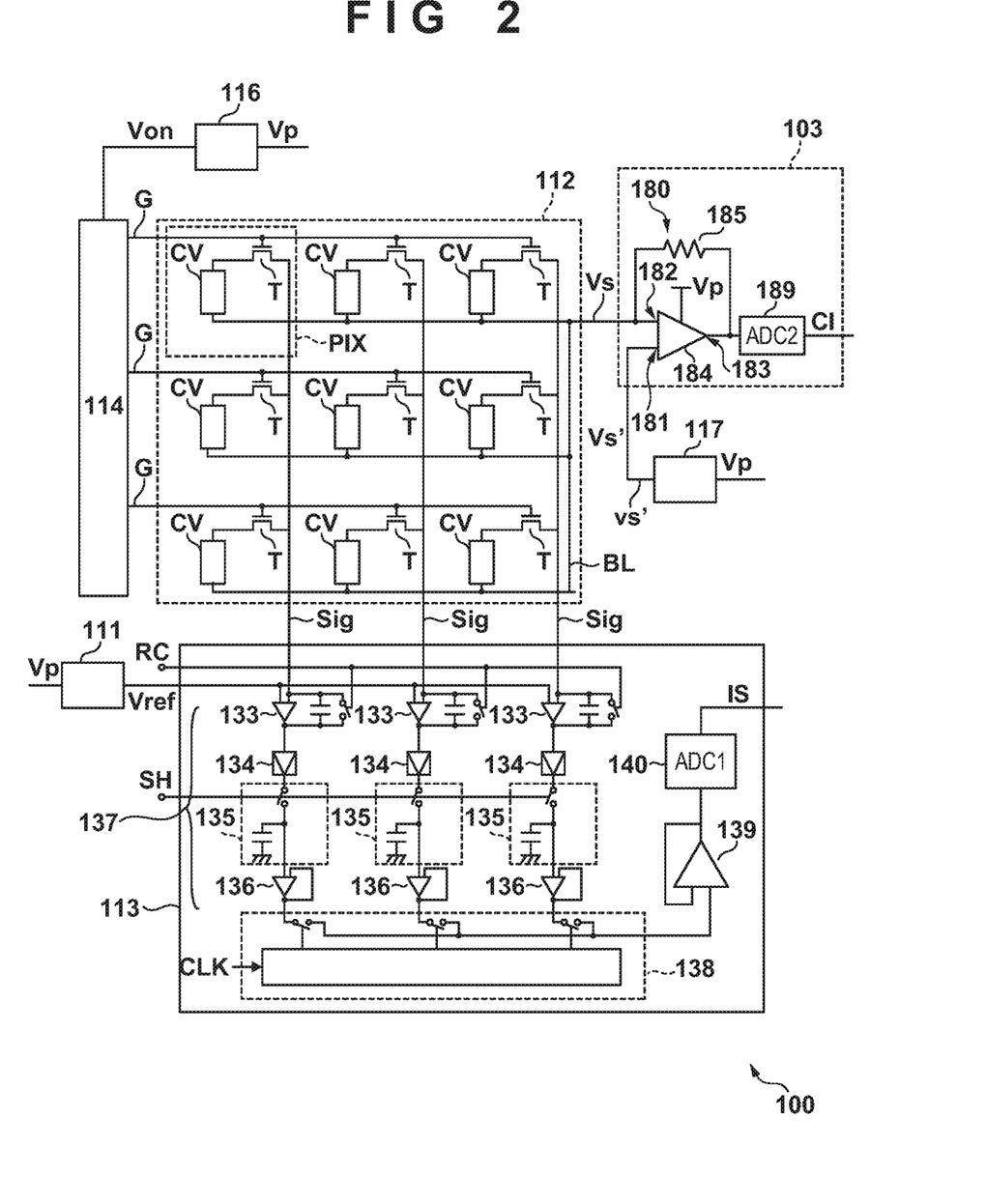
FIG. 2 is a block diagram showing an example of the arrangement of an imaging unit of a radiation imaging apparatus.

FIG. 2 shows an example of the arrangement of the imaging unit 100. The imaging unit 100 can include, as described above, the pixel array 112, the bias circuit 103, the readout circuit 113, the drive circuit 114, the first reference power supply 111, the second reference power supply 117, and the gate power supply 116.

The pixel array 112 includes a plurality of pixels PIX arranged in a two-dimensional array so as to form a plurality of rows and a plurality of columns. Note that in FIG. 2, although the pixels PIX have been arranged so as to form 3 rows×3 columns for the sake of descriptive convenience, more pixels PIX will be actually arranged so as to form as many rows and many columns. Each pixel PIX can include a conversion element CV that converts radiation or light into charges and a switch element T that outputs an analog signal (electrical signal) corresponding to the charges to a corresponding signal line Sig. Each pixel PIX can also include an amplification circuit and/or a sampling circuit.

Each conversion element CV can be an indirect conversion element that includes a photoelectric conversion element which converts light into charges and a wavelength converter (scintillator) which converts the radiation into light having a wavelength that can be detected by the photoelectric conversion element. Alternatively, the conversion element CV can be a direct conversion element that can directly convert the radiation into charges. The photoelectric conversion element can be, for example, a PIN photodiode made mainly from amorphous silicon arranged on an insulated substrate such as a glass substrate. If the photoelectric conversion element of the conversion element CV is a PIN photodiode, the conversion element CV can have capacitance.

The switch element T can be a transistor, such a thin-film transistor (TFT) that includes a control terminal and two main terminals. One electrode of the conversion element CV is electrically connected to one of the two main terminals of the switch element T, and the other electrode of the conversion element CV is electrically connected to the common bias line BL. The other of the two main terminals of the switch element T can be connected to the corresponding signal line Sig. The bias voltage Vs is supplied to the bias line BL by the bias circuit 103.

The gate of the switch element T is connected to a driving signal line G which is driven by the drive circuit 114. The drive circuit 114 drives the driving signal line G of a row to be selected in the pixel array 112 to active level (gate voltage Von). When an active-level signal is supplied to the gate of the switch element T through the driving signal line G, the switch element T is changed to a conductive state. As a result, the signals corresponding to the charges accumulated in the conversion elements CV of the respective pixels PIX of the selected row are output in parallel to the plurality of signal lines Sig.

The analog signal output to each signal line Sig is read out by the readout circuit 113. The readout circuit 113 includes a plurality of amplification circuits 137 and a multiplexer 138. The plurality of amplification circuits 137 are arranged so that one amplification circuit 137 corresponds to one signal line Sig. The signals from the pixels PIX of the selected row which are output in parallel to the plurality of signal lines Sig are amplified in parallel by the plurality of amplification circuits 137.

Figure 3:
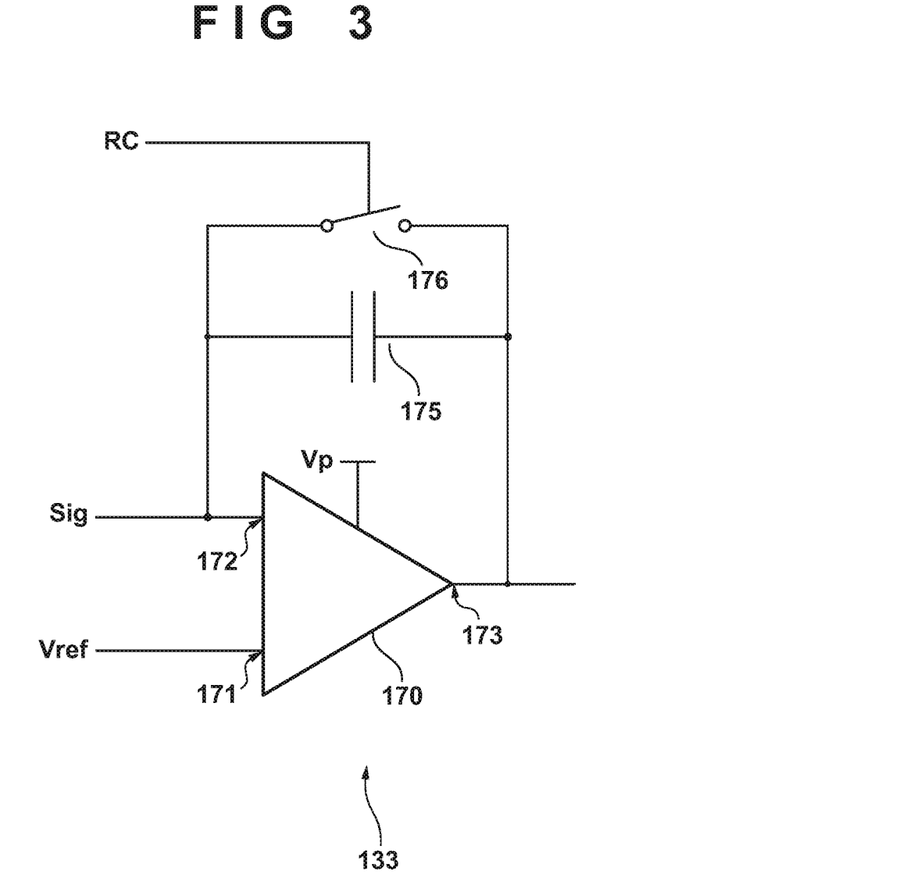
FIG. 3 is a circuit diagram showing an example of the arrangement of an amplification circuit of a readout circuit.

Each amplification circuit 137 can include, for example, an amplifier (integration amplifier) 133, a variable amplifier 134 that amplifies the signal from the amplifier 133, a sample and hold circuit 135 that samples and holds the signal from the variable amplifier 134, and a buffer amplifier 136. As exemplified in FIG. 3, the amplifier 133 can include a differential amplifier 170, a feedback impedance (integration capacitor) 175, and a reset switch 176. The differential amplifier 170 includes a first input terminal (non-inverting input terminal) 171, a second input terminal (inverting input terminal) 172, and a first output terminal 173. The feedback impedance (integration capacitor) 175 that connects the second input terminal 172 and the first output terminal 173 can be included. The amplifier 133 can be formed to be capable of changing an amplification factor by changing the capacitance value of the feedback impedance (integration capacitor) 175. The first reference voltage Vref is supplied from the first reference power supply 111 to the first input terminal 171, a signal output to the signal line Sig is supplied to the second input terminal 172, and the first output terminal 173 is connected to the input terminal of the variable amplifier 134. The feedback impedance 175 and the reset switch 176 are connected in parallel to each other between the second input terminal 172 and the first output terminal 173 of the differential amplifier 170. The sample and hold circuit 135 can be formed by, for example, a sampling switch and a sampling capacitor.

The multiplexer 138 sequentially selects and outputs signals that are read out in parallel from the plurality of amplification circuits 137 corresponding to the plurality of signal lines Sig. The readout circuit 113 can include, for example, a buffer amplifier 139 that buffers each signal from the multiplexer 138. The buffer amplifier 139 can function as an impedance converter. The readout circuit 113 can include an AD converter 140. The AD converter 140 can be arranged, for example, so as to convert each analog signal output from the buffer amplifier 139 into the image signal IS which serves as a digital signal. The image signal IS output from the readout circuit 113 can be provided to the computer 300. The computer 300 processes the image signal IS output from the readout circuit 113.

Upon receiving the power supply voltage Vp from the power supply circuit 210 and the second reference voltage Vs' supplied from the second reference power supply 117, the bias circuit 103 generates the bias voltage Vs supplied to the bias line BL. Here, the bias voltage Vs is a voltage generated based on the second reference voltage Vs' as a reference and is a voltage equal to the second reference voltage Vs'. The bias circuit 103 includes a detection circuit to detect the current flowing in the bias line BL in order to detect the start of radiation irradiation to pixel array 112. Here, a bias current will flow in the bias line BL by photoelectric conversion when the conversion element CV of each pixel PIX is irradiated with radiation. Hence, it is possible to detect an irradiation state such as the start of radiation irradiation based on the bias current.

The bias circuit 103 or the detection circuit can include an amplification circuit 180 that operates upon receiving a supply of the power supply voltage Vp. The amplification circuit 180 can include a differential amplifier 184 and a feedback impedance 185. The differential amplifier 184 includes a third input terminal (non-inverting input terminal) 181, a fourth input terminal (inverting input terminal) 182, and a second output terminal 183. The feedback impedance 185 connects the fourth input terminal 182 and the second output terminal 183. The second reference voltage Vs' is supplied from the second reference power supply 117 to the third input terminal 181. The bias line BL is connected to the fourth input terminal 182. The amplification circuit 180 supplies the bias voltage Vs which is equal to the second reference voltage Vs' to the bias line BL by an imaginary short circuit.

An analog signal (voltage) corresponding to the bias current flowing in the bias line BL is output as information indicating the bias current flowing in the bias line BL from the second output terminal of the amplification circuit 180. The bias circuit 103 or the detection circuit can include an AD converter 189 that AD-converts the analog signal (voltage) output from the amplification circuit 180. The AD converter 189 outputs the result, obtained from AD-converting the voltage (signal) output from the amplification circuit 180, as the current information CI indicating the bias current flowing in the bias line BL.

In this example, the function of generating the bias voltage Vs supplied to the bias line BL and the function of detecting the current flowing in the bias line BL are provided by the amplification circuit 180. However, the function of generating the bias voltage Vs supplied to the bias line BL and the function of detecting the current flowing in the bias line BL may be provided by two separate circuits, respectively.

The aforementioned controller 220 generates a control signal to control the drive circuit 114 and a control signal to control the readout circuit 113. The drive circuit 114 sets, in accordance with the control signal from the controller 220, the switch element T of each pixel PIX of a row whose signals are to be read out to the conductive state. The control signal to control the readout circuit 113 can include, for example, a reset signal RC, a sample and hold signal SH, and a clock signal CLK. The reset signal RC is a signal to control the reset switch of each amplifier 133, the sample and hold signal SH is a signal to control each sample and hold circuit 135, and the clock signal CLK is the signal to control the multiplexer 138.

Figure 4:
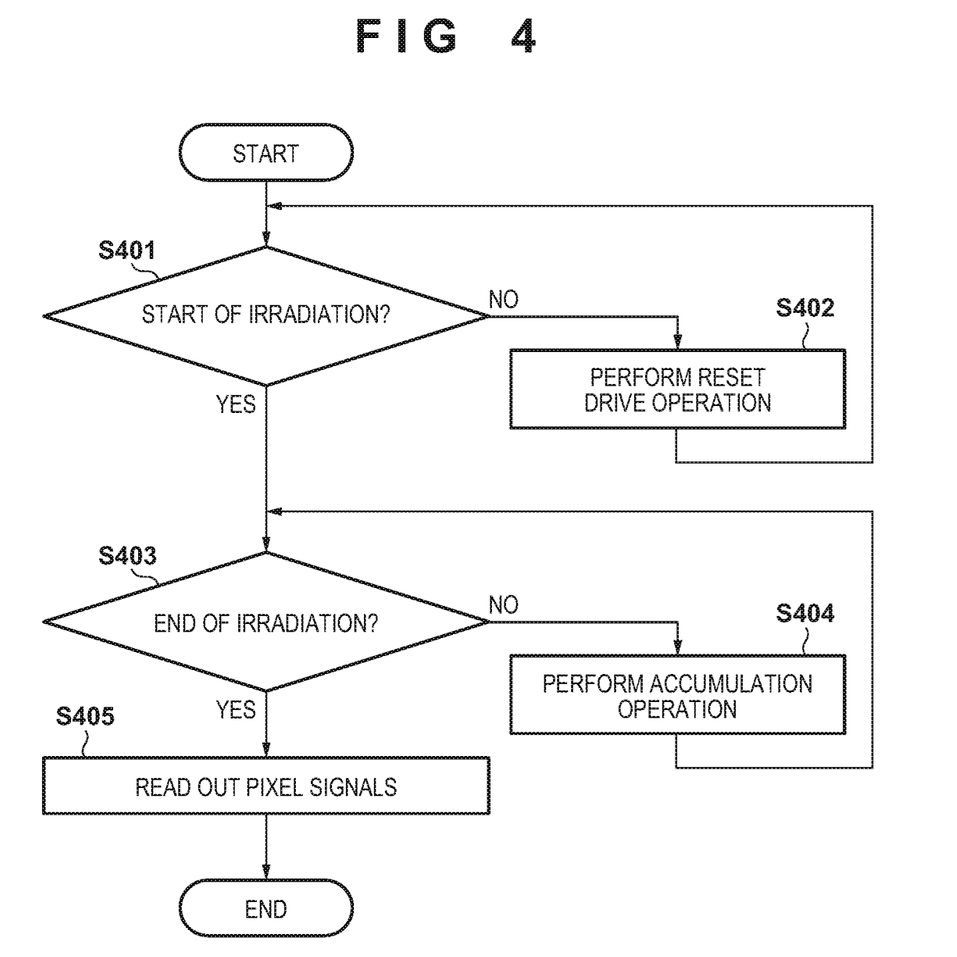
FIG. 4 is a flowchart showing an example of an operation of the radiation imaging system (the radiation imaging apparatus) according to the embodiment of the present invention.

The operation of the radiation imaging system 1 (radiation imaging apparatus 200) will be described with reference to FIGS. 4 and 5. The operation is controlled by the controller 220. Here, assume that the pixel array 112 has 0th to (Y−1)th rows. Assume that signals Vg (0) to Vg (Y−1) are provided to the gates of the switch elements (transistors) T of the pixels PIX of the 0th to (Y−1)th rows by the drive circuit 114 via the corresponding driving signal lines G. Assume that the gate voltage Von is used as the active-level signal of each of 0th to (Y−1)th rows.

In step S401, the controller 220 determines, based on the current information CI provided from the detection circuit of the bias circuit 103, whether radiation irradiation from the radiation source 320 has started. The controller 220 continues to perform a reset drive operation in step S402 until the start of radiation irradiation is determined. The controller 220 advances the process to step S403 when the start of radiation irradiation is determined.

The reset drive operation is an operation in which an operation of providing an active-level signal (gate voltage Von) via the driving signal line G to the switch element T of each pixel PIX belonging to the 0th to (Y−1)th rows in the pixel array 112 is repetitively performed. The operation to provide the active-level signal (gate voltage Von) to the pixels PIX of a given row can be understood as an operation to select the given row. The conversion element CV of each pixel PIX is reset to a level corresponding to the voltage (first reference voltage Vref) of the signal line Sig when the active-level signal is provided to the gate of the switch element T connected to the conversion element CV.

Figure 5:
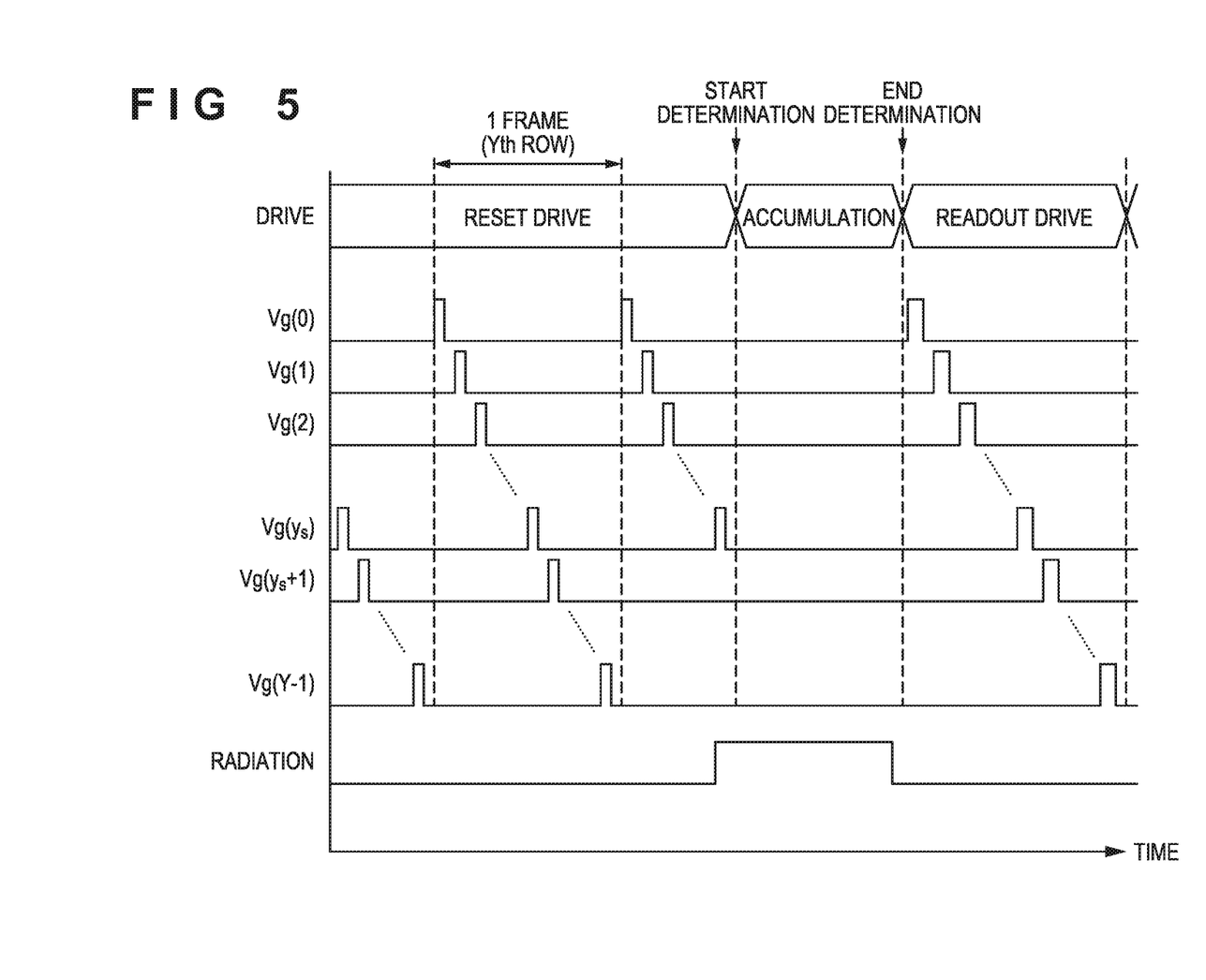
FIG. 5 is a timing chart showing an example of an operation of the radiation imaging system (the radiation imaging apparatus) according to the embodiment of the present invention.

In the example shown in FIG. 5, the controller 220 determines, at the point when the pixels PIX of a $y_s$th row have been reset (selected), whether radiation irradiation has started from the radiation source 320, and the process advances from step S401 to S403. The advancement of the process from step S401 to S403 signifies the end of the reset drive operation and the shift to the accumulation state.

After shifting to the accumulation state in step S403, the controller 220 determines whether the radiation irradiation has ended. The controller 220 maintains the accumulation state of step S404 until the end of radiation irradiation can be determined, and the process advances to step S405 when the end of radiation irradiation is determined. Here, the controller 220 can determine the end of radiation irradiation based on time that has elapsed since the start of radiation irradiation. Alternatively, the controller 220 can determine the end of radiation irradiation when a value indicated by the current information CI has fallen below a predetermined value. Alternatively, the controller 220 can determine the end of radiation irradiation when an integrated value of the current information CI has exceeded a predetermined value.

The advancement of the process from step S403 to step S405 signifies the end of the accumulation state and the shift to a readout drive operation. In step S405, the controller 220 controls the imaging unit 100 so that signals from the plurality of pixels PIX of the pixel array 112 will be read out. In the readout drive operation, the drive circuit 114 selects, for example, the plurality of rows of the pixel array 112 on at least a row basis in a predetermined order, and the readout circuit 113 reads out the signals of the pixels PIX of the selected row in the pixel array 112. Each signal that has been read out is output as the image signal IS from the readout circuit 113 (the imaging unit 100 of the radiation imaging apparatus 200) to the computer 300.

Figure 6:
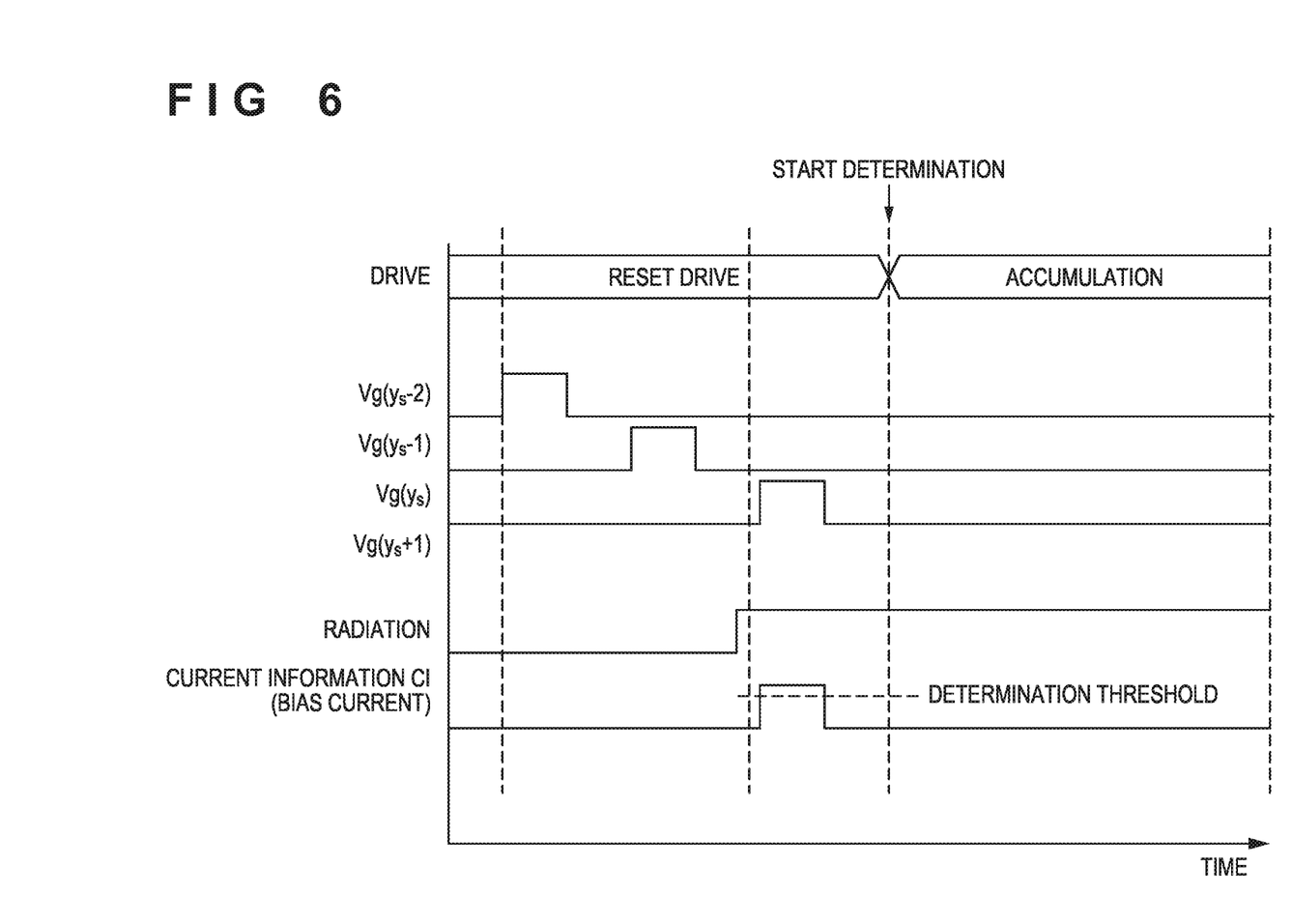
FIG. 6 is a timing chart for explaining radiation irradiation start determination.

FIG. 6 shows the details of the radiation irradiation start determination. In the example shown in FIG. 6, radiation irradiation is started in a period of time between the selection of a $(y_s−1)$th row and the selection of the (y−1)th row, and the current information CI corresponding to this has been generated. The controller 220 determines the start of radiation irradiation (that is, detects the start of radiation irradiation) when the value indicated by the current information CI exceeds a determination threshold, and causes the imaging unit 100 to shift from the reset drive operation to the accumulation state.

Figure 7:
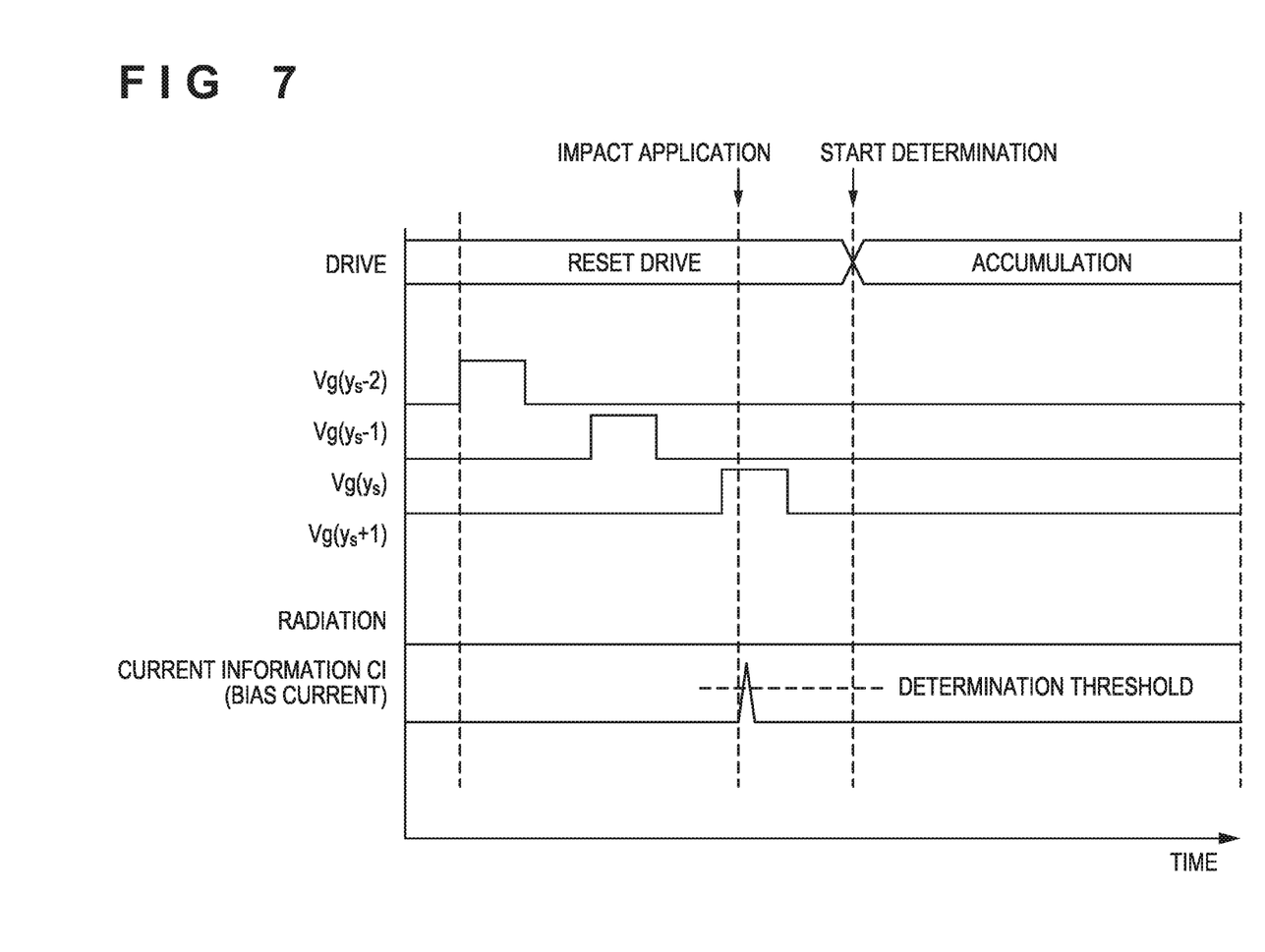
FIG. 7 is a timing chart for explaining an erroneous determination (erroneous detection) caused by an impact (force)

FIG. 7 shows an erroneous determination (erroneous detection) caused by an impact (force). In the example shown in FIG. 7, an impact (force) has been applied to the radiation imaging apparatus 200 in the period between the selection of the $(y_s−1)$th row and the selection of the (y−1)th row, thereby causing the value indicated by the current information CI to exceed the determination threshold and causing an erroneous determination. Here, the erroneous determination represents a determination that the radiation irradiation has started even though the radiation irradiation has not actually started.

Figure 8:
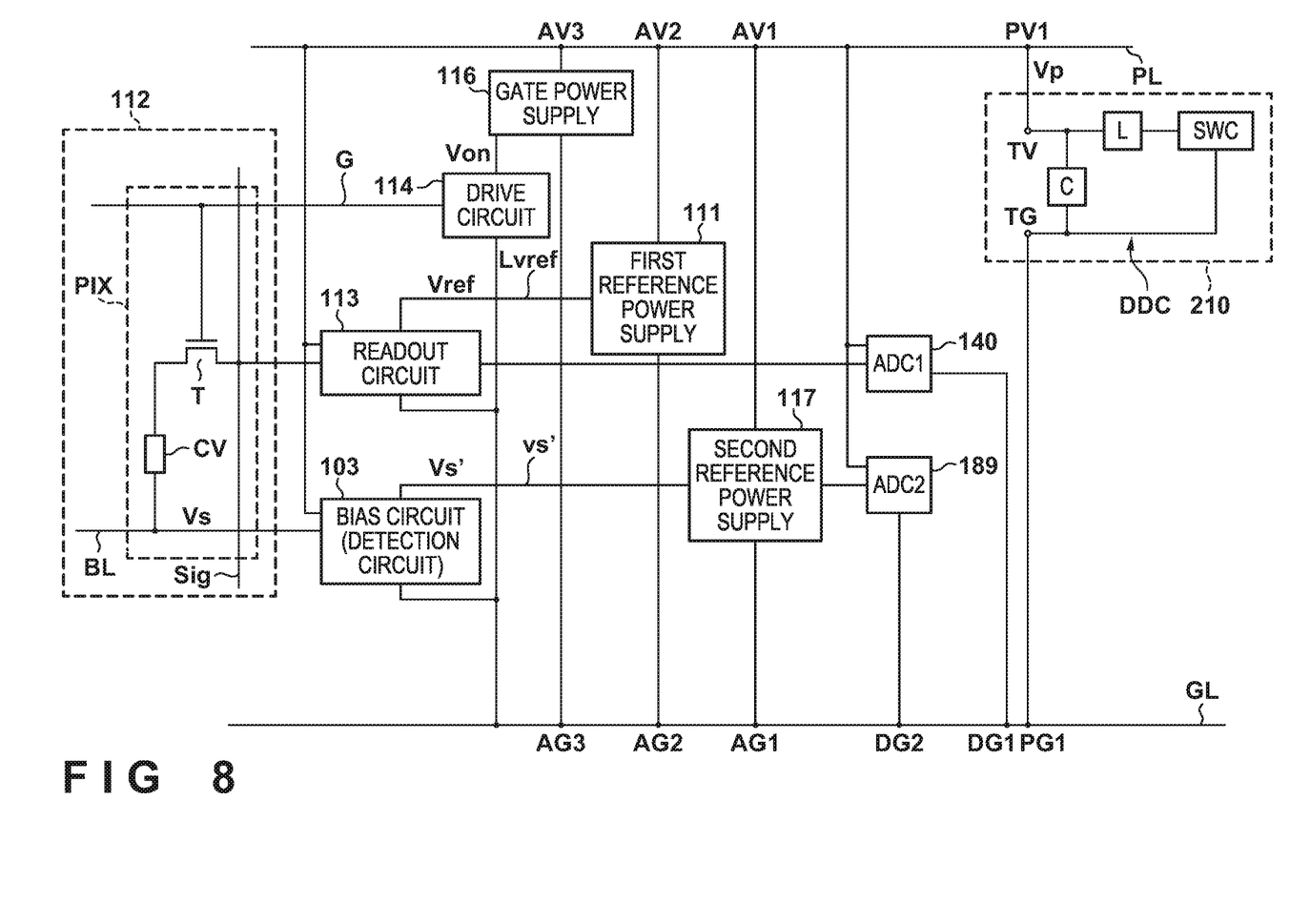
FIG. 8 is a diagram showing an equivalent circuit representing the simplified arrangement of the radiation imaging apparatus.

After conducting an experiment by using a radiation imaging apparatus which has not taken measures according to the present invention, the present inventor has concluded that the cause of the erroneous determination is the current generated by the power supply circuit 210 upon receiving an impact. This cause will be described with reference to FIG. 8. FIG. 8 shows an equivalent circuit representing the simplified arrangement of the radiation imaging apparatus.

FIG. 8 shows one pixel PIX to represent the plurality of pixels PIX of the pixel array 112. The drive circuit 114 is connected to the gate of the switch element T of the pixel PIX via the driving signal line G, and the bias circuit 103 is connected to one terminal of the conversion element CV via the bias line BL. The readout circuit 113 is connected to one main terminal of the switch element T via the signal line Sig.

The gate power supply 116 is connected to the drive circuit 114. The first reference power supply 111 and the AD converter 140 are connected to the readout circuit 113. The second reference power supply 117 is connected to the bias circuit 103, and the AD converter 189 is connected to the second reference power supply 117.

In addition to the power supply voltage Vp supplied from a power supply terminal TV and a ground terminal TG of the power supply circuit 210, the first reference voltage Vref is supplied from the first reference power supply 111 to the readout circuit 113. The readout circuit 113 supplies the first reference voltage Vref to the signal line Sig. The first reference voltage Vref is supplied from the first reference power supply 111 to the readout circuit 113. The first reference power supply 111 includes a power supply terminal AV2 and a ground terminal AG2, and the power supply voltage Vp is supplied from the power supply circuit 210 via the power supply terminal AV2 and the ground terminal AG2 to the first reference power supply 111.

In addition to the power supply voltage Vp supplied from the power supply terminal TV and the ground terminal TG of the power supply circuit 210, the bias voltage Vs (second reference voltage) is supplied from the second reference power supply 117 to the bias circuit 103. The bias circuit 103 supplies the bias voltage Vs to the bias line BL. The second reference voltage Vs' is supplied from the second reference power supply 117 to the bias circuit 103. The second reference power supply 117 includes a power supply terminal AV1 and a ground terminal AG1, and the power supply voltage Vp is supplied from the power supply circuit 210 to the second reference power supply 117.

In addition to the power supply voltage Vp supplied from the power supply terminal TV and the ground terminal TG of the power supply circuit 210, the gate voltage Von is supplied from the gate power supply 116 to the drive circuit 114. The gate power supply 116 includes a power supply terminal AV3 and a ground terminal AG3. The power supply voltage Vp is supplied from the power supply circuit 210 to the gate power supply 116 via the power supply terminal AV3 and the ground terminal AG3. The power supply voltage Vp is supplied from the power supply terminal TV and ground terminal TG of the power supply circuit 210 to the AD converters 140 and 189. The AD converters 140 and 189 include ground terminals DG1 and DG2, respectively.

In addition to a battery (not shown), the power supply circuit 210 includes, for example, a DCDC converter DDC. The DCDC converter DDC can be, for example, a switching-method DCDC converter that includes an inductor L, a capacitor C, and a switching circuit SWC. The capacitor C can be a capacitor that has a piezoelectric effect. The power supply terminals AV1, AV2, and AV3 are connected to the power supply terminal TV of the power supply circuit 210 via a connection terminal PV1 of a power supply line PL. The ground terminals AG1, AG2, AG3, DG1, and DG2 are connected to the ground terminal TG of the power supply circuit 210 via a connection terminal PG1 of a ground line GL.

The power supply circuit 210 can generate, in addition to a normal current, an additional current when an impact (force) is applied to the radiation imaging apparatus 200. The additional current generated by the power supply circuit 210 can be supplied to the first reference power supply 111 via the power supply terminal TV, the connection terminal PV1, the power supply line PL, and the power supply terminal AV2. The additional current supplied to the first reference power supply 111 can be returned to the power supply circuit 210 via the ground terminal AG2, the ground line GL, the connection terminal PG1, and the ground terminal TG. The change in the current supplied to the first reference power supply 111 can change the first reference voltage Vref generated by the first reference power supply 111. The change in the first reference voltage Vref generated by the first reference power supply 111 can change the voltage of each signal line Sig of the pixel array 112. The change in the voltage and the current of each signal line Sig can change the bias current flowing in the bias line BL. The change in the bias current flowing in the bias line BL is detected by the bias circuit 103 as if radiation irradiation has been started.

Also, the additional current generated by the power supply circuit 210 when an impact (force) is applied to the radiation imaging apparatus 200 can be supplied to the second reference power supply 117 via the power supply terminal TV, the connection terminal PV1, power supply line PL, and the power supply terminal AV1. The additional current supplied to the second reference power supply 117 can be returned to the power supply circuit 210 via the ground terminal AG1, the ground line GL, the connection terminal PG1, and the ground terminal TG. The change in the current supplied to the second reference power supply 117 can change the second reference voltage Vs' generated by the second reference power supply 117. The change in the second reference voltage Vs' generated by the second reference power supply 117 can change the bias current flowing in the bias line BL. The change in the bias current flowing in the bias line BL is detected by the bias circuit 103 as if radiation irradiation has been started.

Also, the additional current generated by the power supply circuit 210 when an impact (force) is applied to the radiation imaging apparatus 200 can be supplied to the gate power supply 116 via the power supply terminal TV, the connection terminal PV1, the power supply line PL, and the power supply terminal AV3. The additional current supplied to the gate power supply 116 can be returned to the power supply circuit 210 via the ground terminal AG3, the ground line GL, the connection terminal PG1, and the ground terminal TG. The change in the current supplied to the gate power supply 116 can change the gate voltage Von generated by the gate power supply 116. The change in the gate voltage Von generated by the gate power supply 116 can change the conductive state of the switch element T of each pixel PIX of a row selected by the drive circuit 114. The change in the conductive state of each switch element T can change the bias current flowing in the bias line BL. The change in the bias current flowing in the bias line BL is detected by the bias circuit 103 as if radiation irradiation has been started.

That is, an erroneous determination is caused when the additional current generated by the power supply circuit 210 due to an impact (force) applied to the radiation imaging apparatus 200 is returned to the power supply circuit 210 via at least one of the first reference power supply 111, the second reference power supply 117, and the gate power supply 116.

Figure 9:
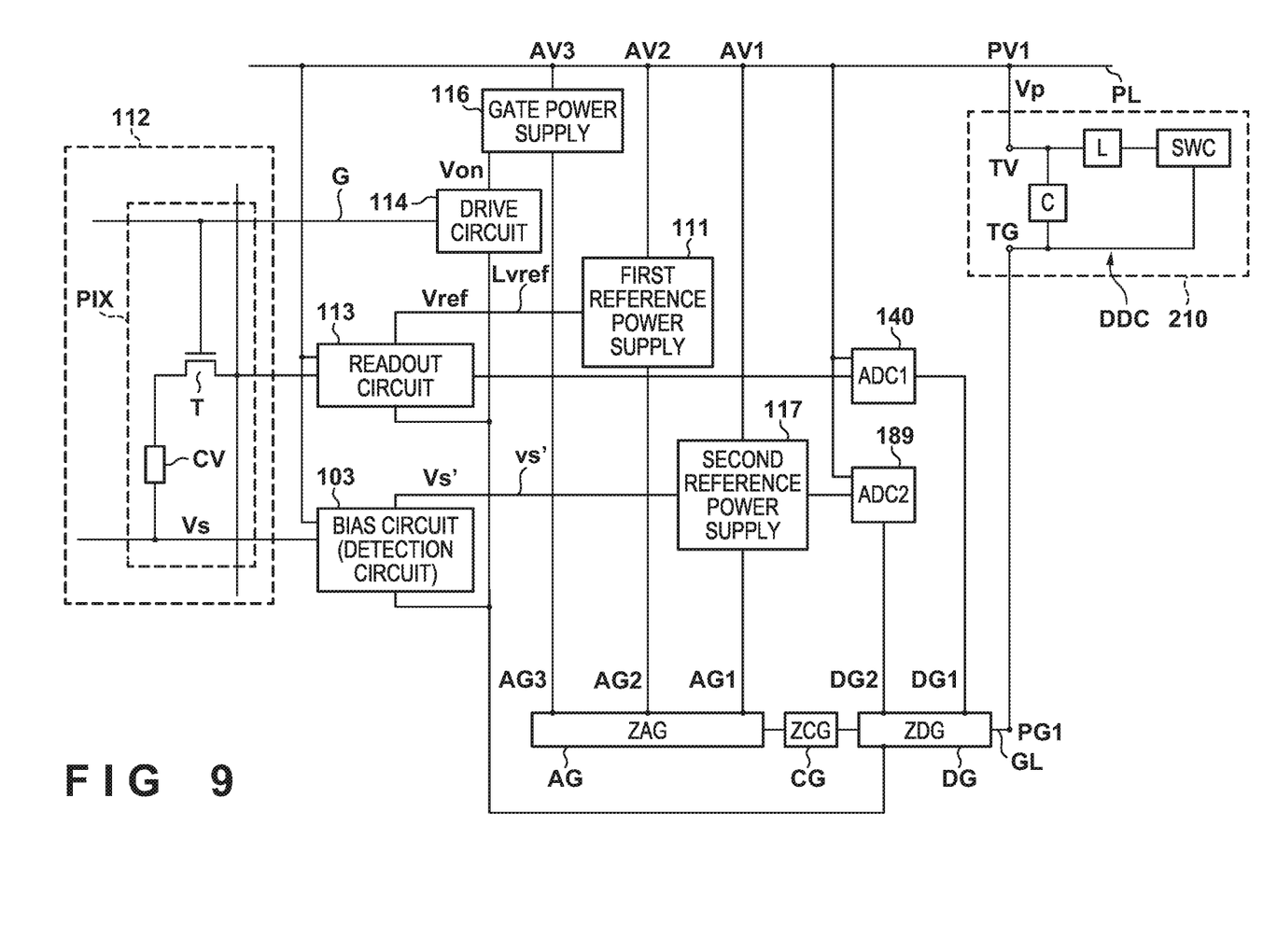
FIG. 9 is a diagram showing an example of the arrangement of a radiation imaging apparatus according to another embodiment of the present invention.

A radiation imaging apparatus 200 having an improved arrangement based on the above-described examination will be described hereinafter. FIG. 9 shows the arrangement of the improved radiation imaging apparatus 200. The radiation imaging apparatus 200 can include a readout circuit 113, a bias circuit 103, a first reference power supply 111, a second reference power supply 117, and a power supply circuit 210. The power supply circuit 210 supplies a power supply voltage Vp to at least the first reference power supply 111, the second reference power supply 117, and an AD converter 189 via a power supply line PL and a ground line GL.

The ground line GL can include a first ground line AG that connects a ground terminal AG2 of the first reference power supply 111 and a ground terminal AG1 of the second reference power supply 117 to each other, a second ground line DG that is connected to the power supply circuit 210, and a third ground line CG that connects the first ground line AG and the second ground line DG. The bias circuit 103 includes a detection circuit that detects the bias current flowing in a bias line BL to detect the start of radiation irradiation to a pixel array 112. The ground line GL can be formed so that an impedance ZCG of the third ground line CG will be higher than an impedance ZAG of a portion of the first ground line AG, which is arranged between the first reference power supply 111 and the second reference power supply 117. The connection terminal of the AD converter 189 of the bias circuit 103 or the detection circuit can be connected to the second ground line DG without intervention of the first ground line AG.

According to the arrangement of such a ground line GL as described above, it is possible to reduce the current that is returned from a power supply terminal TV of the power supply circuit 210 to the ground terminal TG of the power supply circuit 210 via the first reference power supply 111 and the second reference power supply 117. This limits a current that can be generated additionally in the power supply circuit 210 due to an impact from flowing to the first reference power supply 111 and the second reference power supply 117. As a result, it is possible to limit a first reference voltage Vref and a second reference voltage Vs' from being changed by the current that can be generated additionally in the power supply circuit 210 due to an impact, and it is possible to limit the change in the current flowing in the bias line BL. Hence, it is possible to reduce an erroneous determination caused by the current that can be generated additionally in the power supply circuit 210 due to an impact.

The radiation imaging apparatus 200 can further include a drive circuit 114 configured to drive the pixel array 112 and the gate power supply (voltage generation circuit) 116 configured to generate a gate voltage Von supplied to the drive circuit 114. The power supply circuit 210 supplies the power supply voltage Vp to the gate power supply 116 via the power supply line PL and the ground line GL. The first ground line AG can connect the ground terminal AG2 of the first reference power supply 111, the ground terminal AG1 of the second reference power supply 117, and the ground terminal AG3 of the gate power supply 116 to each other. The ground line GL can be formed so that the impedance ZCG of the third ground line CG is higher than the impedance ZAG a portion of the first ground line AG, which is arranged between at least two of the ground terminal AG2, the ground terminal AG1, and the ground terminal AG3.

According to the arrangement of such above-described ground line GL, the current that is returned from the power supply terminal TV of the power supply circuit 210 to the ground terminal TG via the first reference power supply 111, the second reference power supply 117, and the gate power supply 116 can be reduced. This limits the current that can be generated additionally in the power supply circuit 210 due to an impact from flowing in the first reference power supply 111, the second reference power supply 117, and the gate power supply 116. As a result, it is possible to limit the first reference voltage Vref, the second reference voltage Vs', and the gate voltage Von from being changed by the current that can be generated additionally in the power supply circuit 210 by the impact, and it is possible to limit the change in the current flowing in the bias line BL. Hence, it is possible to reduce an erroneous determination that can be additionally generated in the power supply circuit 210 by an impact.

The current that can be generated additionally in the power supply circuit 210 due to an impact can flow through paths that are easy for the current to flow, that is, paths such as an AD converter 140, the AD converter 189, and the second ground line DG. The ground line GL can be arranged so that an impedance ZDG of the second ground line DG is lower than the impedance ZCG of the third ground line CG. That is, the ground line GL is arranged so that the impedance ZCG of the third ground line CG will be higher than the impedance ZDG of the second ground line DG.

The ground terminals of the readout circuit 113 and the bias circuit 103 are connected to the second ground line DG without intervention of the first ground line AG and the third ground line CG. As a result, it is possible to reduce an artifact that can be generated by the limitation placed on the capabilities of the readout circuit 113 and bias circuit 103 by the impedance ZCG of the third ground line CG. The ground terminals of the AD converters 140 and 189 can be connected to the second ground line DG without intervention of the first ground line AG and the third ground line CG. As a result, it is possible to reduce an artifact that can be generated by the limitation placed on the capability of the AD converter 140 by the impedance ZCG of the third ground line CG. Also, it is possible to prevent the degradation of bias-current detection accuracy (AD conversion accuracy) which occurs when the capability of the AD converter 189 is limited by the impedance ZCG of the third ground line CG.

As a method of increasing the impedance ZCG of the third ground line CG (than the impedance ZAG of the first ground line AG), it is advantageous to use, for example, a method in which an AC filter is inserted to the third ground line CG or a method in which the width (sectional area) of the third ground line CG is decreased. Alternatively, an AC filter may be arranged by forming a coil using the third ground line CG.

As a method of decreasing the impedance ZAG of the first ground line AG (than the impedance ZCG of the third ground line CG), it is advantageous to use, for example, a method in which a large dedicated ground plane is arranged on a printed circuit board or a method in which the first ground line AG is connected to a metal substrate.

The ratio between the impedance ZAG of a portion of the first ground line AG, which is arranged between the first reference power supply 111 and the second reference power supply 117 and the impedance ZCG of the third ground line CG is preferably equal to or more than the amplification factor of the amplification circuit 180 of the bias circuit (detection circuit) 103. This is because the possibility of erroneous determination depends on the amplification factor of the amplification circuit 180.

Figure 10:
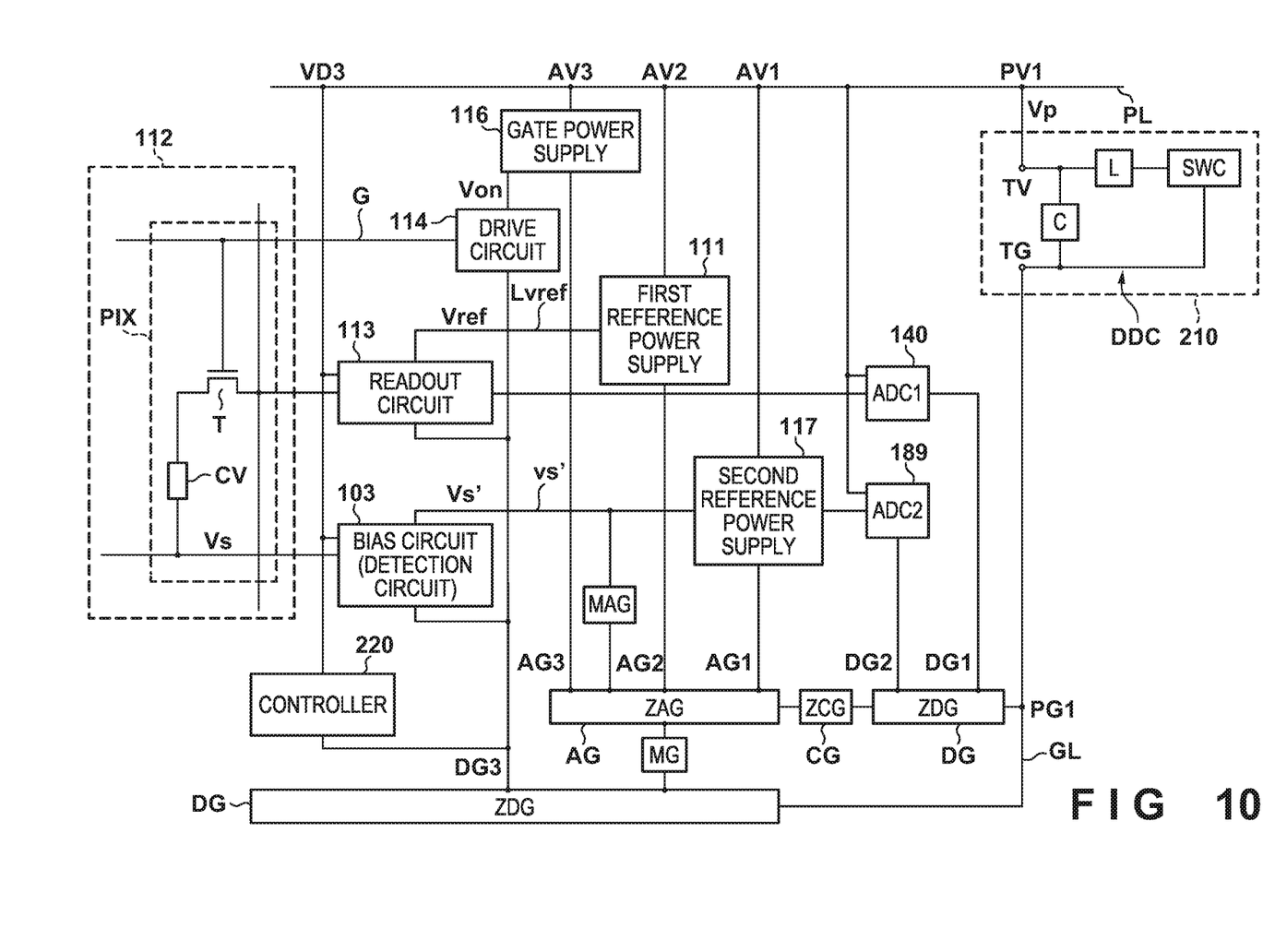
FIG. 10 is a diagram showing an example of the arrangement of a radiation imaging apparatus according to yet another embodiment of the present invention.

In addition to the above-described improvement, a radiation imaging apparatus 200 can also be improved in consideration of electromagnetic coupling. FIG. 10 shows the arrangement of the radiation imaging apparatus 200 which has been improved in consideration of electromagnetic coupling. Various kinds of circuits such as a readout circuit 113, a bias circuit 103, and a controller 220 are arranged between a power supply line PL and a ground line GL, and a power supply voltage Vp is supplied to these circuits via a power supply terminal VD3 and a ground terminal DG3.

An electromagnetic coupling MAG can be present between a second reference voltage line Lvs' and a first ground line AG. Also, an electromagnetic coupling MG can be present between the first ground line AG and a portion of the ground line CL, wherein the portion of the ground line GL excludes the first ground line AG. The electromagnetic coupling signifies a capacitive coupling and/or an inductive coupling. Here, the ground line GL and the second reference voltage line Lvs' can be formed so that the electromagnetic coupling MAG will be stronger than the electromagnetic coupling MG. As a result, the current that can be generated additionally in a power supply circuit 210 due to an impact can be suppressed from flowing via the portion of the ground line GL, the second reference power supply 117, and the second reference voltage line Lvs', wherein the portion of the ground line GL excludes the first ground line AG.

In one example, the ratio between the strength of the electromagnetic coupling MAG and the strength of the electromagnetic coupling MG is preferably equal to or more than the amplification factor of an amplification circuit 180 of the bias circuit (detection circuit) 103. This is because the possibility of erroneous determination depends on the amplification factor of the amplification circuit 180.

As described above, according to the embodiment of the present invention, a technique advantageous in reducing erroneous determination caused by a current that can be generated additionally in the power supply circuit 210 due to an impact is provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-016978, filed Feb. 1, 2017, which is hereby incorporated by reference herein in its entirety.

What is claimed is:

1. A radiation imaging apparatus comprising:
a pixel array in which a plurality of pixels each including a conversion element that converts radiation into an analog signal are arranged and a bias line used to provide a bias voltage to the conversion element of each of the plurality of pixels is arranged;
a readout circuit configured to read out the analog signal from the pixel array;
a bias circuit configured to supply the bias voltage to the bias line and including a detection circuit configured to detect a current flowing in the bias line to detect a start of radiation irradiation to the pixel array, the detection circuit including an amplification circuit configured to output an analog signal in accordance with the current and an AD converter configured to convert the analog signal output from the amplification circuit into a digital signal;
a first reference power supply configured to supply a first reference voltage to the readout circuit;
a second reference power supply configured to supply a second reference voltage to the amplification circuit; and
a power supply circuit configured to supply a power supply voltage to at least the first reference power supply, the second reference power supply, and the AD converter via a power supply voltage line and a ground line,
wherein the ground line includes a first ground line that connects a ground terminal of the first reference power supply and a ground terminal of the second reference power supply to each other and a second ground line connected to the power supply circuit and the first ground line,
an impedance of the second ground line is higher than an impedance of a portion of the first ground line, which is arranged between the first reference power supply and the second reference power supply, and
a ground terminal of the AD converter is connected to the second ground line without intervention of the first ground line.

2. The apparatus according to claim 1, wherein
the ground line further includes a third ground line that connects the first ground line to the second ground line,
an impedance of the third ground line is higher than the impedance of the second ground line, and
the ground terminal of the AD converter is connected to the second ground line without intervention of the first ground line and the third ground line.

3. The apparatus according to claim 2, wherein the readout circuit includes:
a differential amplifier having a first input terminal, a second input terminal, and a first output terminal; and
a feedback impedance that connects the second input terminal to the first input terminal,
wherein the first reference voltage is supplied to the first input terminal, and a signal is supplied from the pixel array to the second input terminal.

4. The apparatus according to claim 2, wherein a ratio between the impedance of the third ground line and the impedance of a portion of the first ground line, which is arranged between the first reference power supply and the second reference power supply, is not less than an amplification factor of the amplification circuit.

5. The apparatus according to claim 2, wherein a ground terminal of the readout circuit is connected to the second ground line without intervention of the first ground line and the third ground line.

6. The apparatus according to claim 2, wherein a ground terminal of the bias circuit is connected to the second ground line without intervention of the first ground line and the third ground line.

7. The apparatus according to claim 1, wherein the amplification circuit includes:
a differential amplifier having a third input terminal, a fourth input terminal, and a second output terminal; and
a feedback impedance that connects the fourth input terminal to the second output terminal,
wherein the second reference voltage is supplied to the third input terminal, and the bias line is connected to the fourth input terminal.

8. The apparatus according to claim 7, wherein the detection circuit outputs information that appears in the second output terminal.

9. The apparatus according to claim 8, wherein the AD converter converts a voltage that appears in the second output terminal into a digital signal.

10. The apparatus according to claim 1, further comprising:
a circuit to which the power supply voltage is supplied from the power supply circuit through the power supply voltage line and the ground line,
wherein the second reference power supply supplies the second reference voltage to the bias circuit via a second reference voltage line, and
an electromagnetic coupling between the second reference voltage line and the first ground line is stronger than an electromagnetic coupling between the first ground line and a portion of the ground line, the portion of the ground line excluding the first ground line.

11. The apparatus according to claim 1, further comprising:
- a circuit to which the power supply voltage is supplied from the power supply circuit through the power supply voltage line and the ground line,
- wherein the second reference power supply supplies the second reference voltage to the bias circuit via a second reference voltage line, and
- a ratio between the strength of an electromagnetic coupling between the second reference voltage line and the first ground line and the strength of an electromagnetic coupling between the first ground line and a portion of the ground line is not less than an amplification factor of the amplification circuit, the portion of the ground line excluding the first ground line.

12. The apparatus according to claim 1, further comprising:
- a drive circuit configured to drive the pixel array; and
- a voltage generation circuit configured to generate a voltage to be supplied to the drive circuit,
- wherein the first ground line connects the ground terminal of the first reference power supply, the ground terminal of the second reference power supply, and a ground terminal of the voltage generation circuit to each other.

13. The apparatus according to claim 12, wherein each of the plurality of pixels includes a transistor configured to output the analog signal of the conversion element, and
- the drive circuit is configured to drive a gate of the transistor.

14. A radiation imaging system comprising:
- a radiation imaging apparatus defined in claim 1; and
- a computer configured to process an image signal output from the radiation imaging apparatus.

15. A radiation imaging apparatus comprising:
- a pixel array in which a plurality of pixels each including a conversion element that converts radiation into an electrical signal are arranged and a bias line used to provide a bias voltage to one electrode of the conversion element of each of the plurality of pixels;
- a readout circuit configured to read out a signal from the pixel array and to provide a voltage based on a first reference voltage to the other electrode of each of the conversion elements of the plurality of pixels;
- a first circuit configured to supply the bias voltage based on a second reference voltage to the bias line and to output a signal corresponding to a current flowing in the bias line to detect a start of radiation irradiation to the pixel array;
- a second circuit configured to process the signal output from the first circuit;
- a first reference power supply configured to supply the first reference voltage to the readout circuit;
- a second reference power supply configured to supply the second reference voltage to the first circuit; and
- a power supply circuit configured to supply a power supply voltage to at least the first reference power supply, the second reference power supply, and the second circuit via a power supply voltage line and a ground line,
- wherein the ground line includes a first ground line that connects a ground terminal of the first reference voltage and a ground terminal of the second reference voltage to each other and a second ground line connected to the power supply circuit and the first ground line,
- an impedance of the second ground line is higher than an impedance of a portion of the first ground line, which is arranged between the first reference power supply and the second reference power supply, and
- a ground terminal of the second circuit is connected to the second ground line without intervention of the first ground line.

16. The apparatus according to claim 15, wherein
the ground line further includes a third ground line that connects the first ground line and the second ground line,
an impedance of the third ground line is higher than the impedance of the second ground line, and
a ground terminal of the second circuit is connected to the second ground line without intervention of the first ground line and the third ground line.

17. A radiation imaging system comprising:
a radiation imaging apparatus defined in claim 15; and
a computer configured to process an image signal output from the radiation imaging apparatus.

* * * * *